United States Patent [19]

Lantto

[11] Patent Number: 5,428,665
[45] Date of Patent: Jun. 27, 1995

[54] METHOD OF MANAGING SUPPLEMENTARY SERVICE PROCEDURES IN GSM/VLR TOWARDS HLR

[75] Inventor: Sven J. Lantto, Tullinge, Sweden

[73] Assignee: Telefonaktiebolaget LM Ericsson, Stockholm, Sweden

[21] Appl. No.: 141,094

[22] Filed: Oct. 26, 1993

[30] Foreign Application Priority Data

Oct. 27, 1992 [SE] Sweden ............................. 9203144

[51] Int. Cl.$^6$ ............................................... H04Q 7/22
[52] U.S. Cl. ...................................... 379/58; 380/21; 455/33.1
[58] Field of Search ...................... 379/58, 59; 380/21, 380/23, 43, 48; 455/33.1; 340/825.31, 825.34

[56] References Cited

U.S. PATENT DOCUMENTS

| | | |
|---|---|---|
| 4,901,340 | 2/1990 | Parker et al. |
| 5,241,598 | 8/1993 | Raith ........................ 380/21 |
| 5,260,987 | 11/1993 | Mauger ..................... 379/58 |
| 5,305,466 | 4/1994 | Taketsugu ............... 455/33.1 |

FOREIGN PATENT DOCUMENTS

295678 12/1988 European Pat. Off.
462728 12/1991 European Pat. Off.

OTHER PUBLICATIONS

Ballard, Issermann, Sanchez, "Cellular Mobile Radio as an Intelligent Network Application", Electrical Communication 1989.

Delory, Treillard, "Security and Saturation Solutions for GSM" Telephone Engineer and Mangement, Jan. 16, 1991.

*Primary Examiner*—Curtis Kuntz
*Assistant Examiner*—William Cumming
*Attorney, Agent, or Firm*—Burns, Doane, Swecker & Mathis

[57] ABSTRACT

In a Mobile Services Switching Center/Visitor Location Register (MSC/VLR), requests (made by a mobile station (MS)) for supplementary services may require processing only by the MSC/VLR, or they may require processing by a Home Location Register (HLR). A method of managing supplementary service procedures that are processed by an HLR includes supplying the MSC/VLR with a list containing only those supplementary service operations that shall be terminated in the MSC/VLR. In the MSC/VLR, a forward direction message is received from an MS, the forward direction message including an intended supplementary service operation. Then, the intended supplementary service operation is compared with the list of supplementary service operations. If the intended supplementary service operation is contained in the list of supplementary service operations, then the intended operation is terminated in the MSC/VLR. However, if the intended supplementary service operation is not contained in the list of supplementary service operations, then the forward direction message is forwarded, unaltered, to the HLR.

1 Claim, 3 Drawing Sheets

METHOD OF MANAGING SUPPLEMENTARY SERVICE PROCEDURES IN GSM/VLR TOWARDS HLR

BACKGROUND

The present invention generally relates to cellular mobile radio systems based upon the so called GSM standard (GSM—Global System for Mobile communication) and more particularly to a method of managing supplementary service procedures.

A GSM network basically comprises at least one base station system BSS including a base station controller BSC and base station transceivers BTS. The GSM network furthermore includes a mobile services switching centre MSC, a home location register HLR and a visitors location register VLR.

Each subscribing mobile station MS belongs to a HLR in a home network, wherein permanent subscriber data is stored. When a mobile station is registered in a MSC/VLR as a new visitor, that mobile station's HLR sends a copy of the relevant subscriber data to MSC/VLR.

Supplementary service procedures are those procedures that are used by an MS (Mobile Station) in the GSM-system either to change supplementary service data or to question the network about current supplementary service data. This procedure may, for instance, involve activating a supplementary service, registering data for a supplementary service, inquiring about data for a given supplementary service, etc.

In a GSM-network, subscriber data is stored permanently in HLR as indicated above. This implies that procedures used by an MS to request changes in subscriber service data will preferably be terminated in HLR, which is responsible for such data. The MSC/VLR responsible for signalling with MS store only copies of the supplementary service data. This data is received in MSC/VLR from HLR in conjunction with a report from MS that the mobile is a new "visitor" in MSC/VLR.

Since it is MSC/VLR that communicates directly with MS in conjunction with supplementary service procedures, it is MSC/VLR that terminates these procedures as seen from MSC. However, as mentioned, the GSM-network is distributed so that, in the main, it is the HLR which is the actual recipient or target of these procedures. MSC/VLR merely constitutes a procedure transfer point. This is an exception rather than a rule however, since certain procedures are terminated in MSC/VLR and not all of the procedures are transferred to HLR. An example in this respect is found in a query which concerns data that is applicable at that time for a given supplementary service, this query being terminated in MSC/VLR and not in HLR. This applies, however, only to those services that are controlled by MSC/VLR. When signalling between MS and MSC/VLR, the supplementary service procedures are implemented purely in protocol fashion with the aid of rules that are in accord with the ROSE-concept (Remote Operations Service Element—specified in CCITT X.219 and X.220). This means that all procedures are specified in a protocol fashion as operations. These operations are descriptions of the configuration of the forward and backward messages included in the actual procedure from the aspect of their protocol content. The forward and backward messages included in an operation are called components.

CCITT #7 TCAP (Translation Capabilities Application Part—specified in CCITT Q.771–Q.775) is utilized when signalling between MSC/VLR and HLR. TCAP is also based on ROSE. This enables operations that are used in signalling between MSC/VLR and MS to be "imported" and used also when signalling between MSC/VLR and HLR.

EP 295,678 describes a radio telephony system in which a "radio connector" sends an ID-number for the radio zone in which it is located. The radio telephone compares the received radio-zone ID-number with the number stored in a memory. If the ID-numbers do not mutually coincide, the radio-telephone ID-number and the received radio-zone ID-number are sent as a position entry signal to a radio control unit, via a "radio connector". The radio-channel control unit registers the two ID-numbers.

U.S. Pat. No. 4,901,340 discloses essentially a general picture of the standpoint of techniques with regard to mobile telephony, where mobiles are located in foreign areas outside their home service area.

SUMMARY

As will be evident from the above, when MSC/VLR receives a supplementary service operation from a mobile station it is necessary for MSC/VLR to decide whether the operation shall be terminated in MSC/VLR or forwarded to HLR. The object of the present invention is to simplify the procedure when the operation concerned shall not be terminated in MSC/VLR, but shall be forwarded to HLR.

This object is achieved in a method of managing supplementary service procedures in GSM/VLR towards HLR which, in accordance with the invention, comprises the following steps
   a) letting MSC/VLR be aware only of those operations that shall be terminated in MSC/VLR,
   b) checking the intended operation when receiving a forward direction message within an operation from an MS for deciding whether the operation is known to MSC/VLR, and
   c) if the operation is known to MSC/VLR, terminating it in MSC/VLR,
   d) if the operation is not known to MSC/VLR, making no further check of it but forwarding the message to HLR in the condition in which it was received in MSC/VLR.

A preferred embodiment comprises the following steps checking in step b) the invoke component of said operation by the Operation Code,
   terminating in step c) the operation if the value the of Operation Code coincides with a value known to MSC/VLR,
   making in step d) no further check of the received invoke component if the value of Operation Code is not known to MSC/VLR but forwarding it to HLR in the condition in which it was received in MSC/VLR.

BRIEF DESCRIPTION OF THE DRAWINGS

The invention will now be described in more detail with reference to the accompanying drawings, in which.

DETAILED DESCRIPTION

Figure 1:
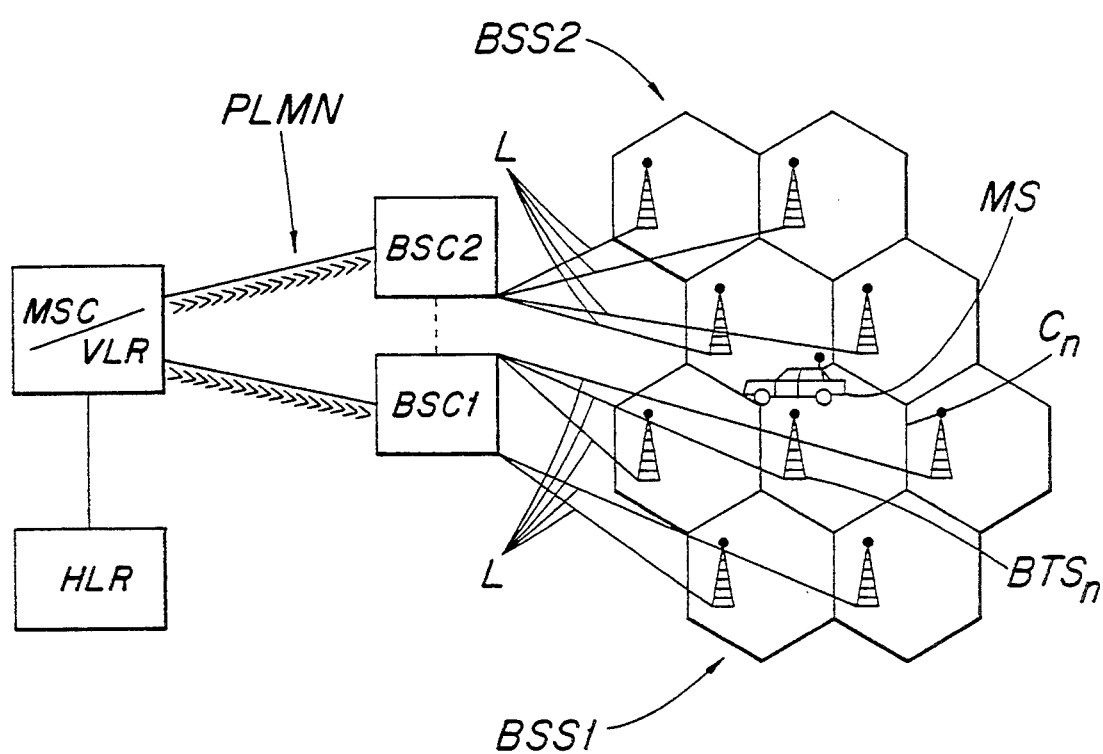
FIG. 1 is a schematic diagram illustrating the basic structure of a conventional GSM network.

With reference to FIG. 1, a GSM cellular network basically comprises a number of base station systems, of which two are generally indicated at BSS1 and BSS2, respectively. Each of the base station systems BSS1 and BSS2 includes a base station controller BSC1 and BSC2, respectively, connected to base station transceivers BTS via communication links L, one of said base station transceivers being designated $BTS_N$ in FIG. 1. Each transceiver BTS is located in an associated cell of the cellular network, which is shown in FIG. 1 as a honeycomb structure wherein each hexagon represents a cell. In FIG. 1 the cell containing the transceiver $BTS_N$ is designated $C_N$. The GSM network furthermore includes a mobile services switching centre MSC having a visitors location register VLR. There are furthermore one or more home location registers communicating with MSC. The MSC is connected for communication with the base station controllers BSC1 and BSC2 via a public land mobile network PLMN.

Although not shown, the MSC shown in FIG. 1 usually has an interface to other MSCs, each MSC having furthermore interfaces for connection to a local public switched telephone network.

Each subscribing mobile station MS belongs to a HLR in a home network, wherein permanent subscriber data is stored. When a mobile is registered in a MSC/VLR as a new visitor, HLR sends a copy of the relevant subscriber data to MSC/VLR.

When signalling between MS and MSC/VLR, the supplementary service procedures are implemented purely in protocol fashion with the aid of rules that are in accord with the ROSE-concept (Remote Operations Service Element—specified in CCITT X.219 and X.220). This means that all procedures are specified in a protocol fashion as operations. These operations are descriptions of the configuration of the forward and backward messages included in the actual procedure from the aspect of their protocol content. The forward and backward messages included in an operation are called components.

CCITT #7 TCAP (Translation Capabilities Application Part—specified in CCITT Q.771–Q.775) is utilized when signalling between MSC/VLR. TCAP is also based on ROSE. This enables operations that are used in signalling between MSC/VLR and MS to be "imported" and used also when signalling between MSC/VLR and HLR. CCITT X.219, X.220, and Q.771–Q.775 are incorporated here by reference.

Figure 2:
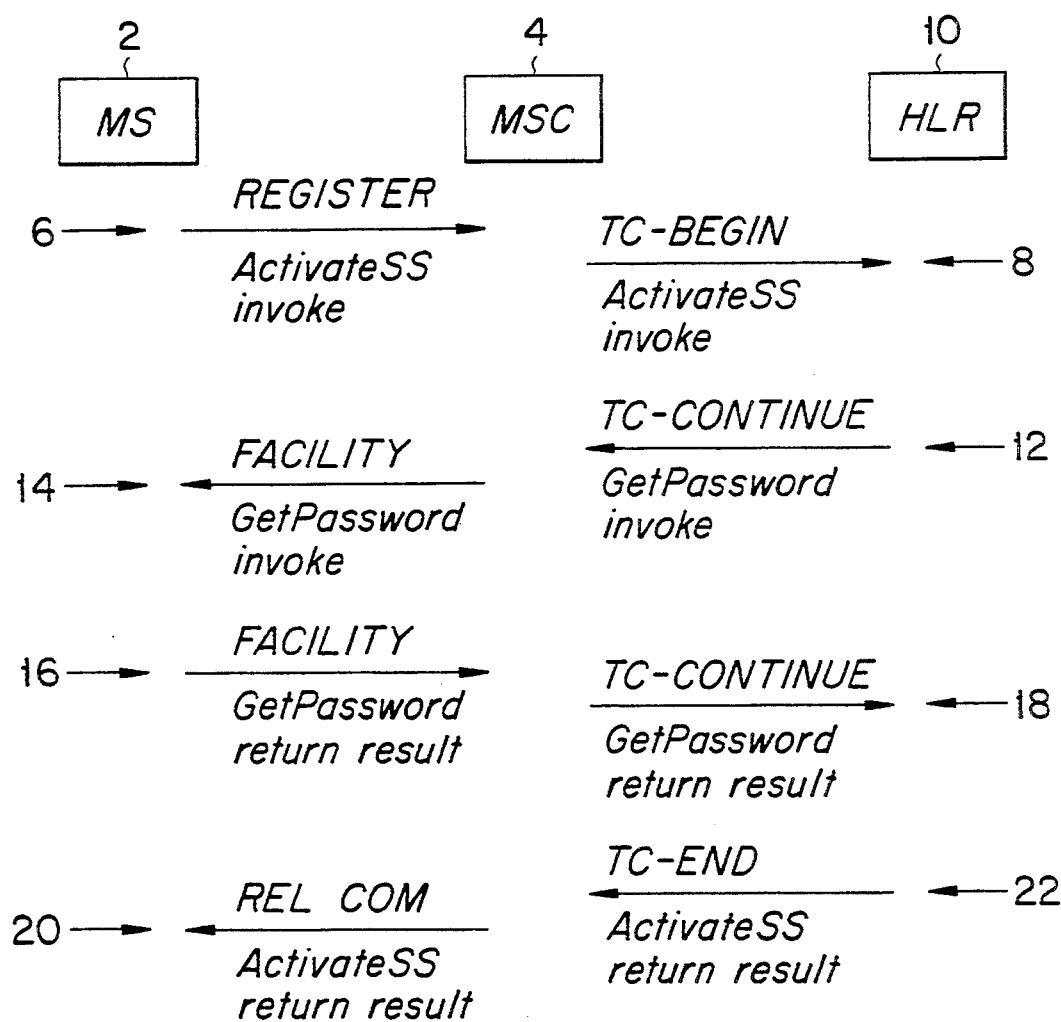
FIG. 2 illustrates schematically a conventional supplementary service procedure including signalling between MS and MSC/VLR and between MSC/VLR and HLR.

FIG. 2 illustrates an example of conventional supplementary service procedures, including signalling between MS and MSC/VLR and also between MSC/VLR and HLR.

When signalling between MS, indicated in FIG. 2 as a block 2, and MSC/VLR, similarily indicated as a block 4, the procedure is started by MS, by signalling the forward message in the operation (called invoke component) "ActivateSS" in a REGISTER-message 6. The REGISTER-message thus establishes a signalling connection between MS and MSC/VLR. A dialogue is established by MSC/VLR 4 by sending a TCAP TC-BEGIN message 8 containing the invoke component of the operation "ActivateSS" to HLR, indicated as a block 10.

A TCAP TC-CONTINUE message 12 containing the invoke component of the operation "GetPassword" is used by HLR to continue signalling in this dialogue. In response, MSC/VLR forwards a FACILITY-message 14 containing the invoke component of the operation "GetPassword" to MS. MS answers in a FACILITY-message 16 containing the return result component of the operation "GetPassword" to MSC. MSC continues by forwarding the TCAP TC-CONTINUE message 18 containing the return result component of the operation "GetPassword" to HLR.

Generally, in response to a message from MS, MSC/VLR can either send a FACILITY-message, such as 14, or a RELEASE COMPLETE-message, such as 20. The FACILITY-message is used to signal on an existing signalling connection without releasing the connection. The RELEASE COMPLETE-message is used to release the signal connection.

The FACILITY-message and the RELEASE COMPLETE-message are used either to respond to the requested operation either with a positive or with a negative reply, and to start a new operation when so required.

Generally, between MSC and HLR, a dialogue is established by sending a TC-BEGIN message. TC-CONTINUE is used to continue signalling in this dialogue, and TC-END 22 is used to end the dialogue. The user is able to send different types of components in all of these TCAP-messages.

As appears from the above, MSC/VLR when receiving a supplementary operation must decide whether it shall be terminated in MSC/VLR or if it shall be passed on to HLR. The present invention relates to the case where the procedure shall not be terminated in MSC/VLR but shall be passed on to HLR.

Figure 3:
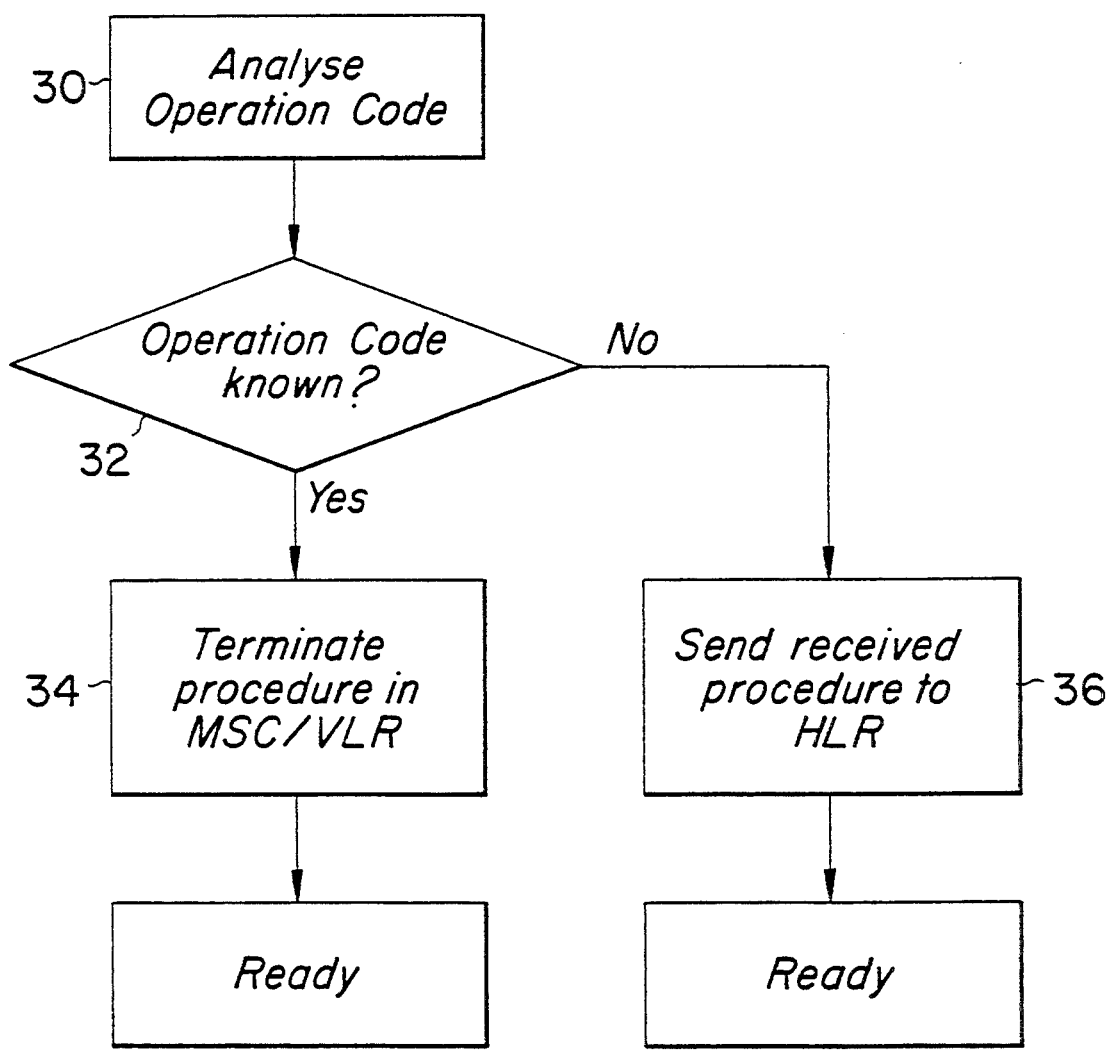
FIG. 3 illustrates similarly an example of how MSC/VLR manages a supplementary service procedure from MS which shall be forwarded to HLR, in accordance with the present invention.

The invention implies that MSC/VLR is aware solely of those operations that shall be terminated in MSC/VLR. When receiving an invoke component within an operation from an MS, a check is made to determine the operation concerned. This is indicated by a value called an Operation Code. With reference to FIG. 3, MSC/VLR in step 30 analyses the Operation Code. If the Operation Code value coincides, as decided in step 32, with one of the values known to MSC/VLR, the procedure is terminated in MSC/VLR, step 34.

If the operation code value is not known to MSC/VLR, MSC/VLR makes no further syntactic check of the received invoke component.

When practicing conventional standards for signalling between MSC/VLR and HLR, it would now have been normal practice to create a new invoke component of which a part includes new data allocated by MSC/VLR and also data that MSC/VLR has received from MS. This has meant that MSC/VLR must be aware of some part of the content of operations that are actually transparent to MSC/VLR, and also the identity of these operations and how they function.

Instead of MSC/VLR being aware of those operations that shall be signalled or forwarded to HLR, the invention is based on the concept that MSC/VLR will be aware solely of those operations that shall not be signalled to HLR. In accordance with this solution, those operations that shall not be terminated in MSC/VLR, i.e. operations that shall be signalled to HLR, are unknown to MSC/VLR and shall be one-hundred percent transparent to MSC/VLR.

Instead of allocating certain own data within the invoke component, the component in step 36 is forwarded to HLR in the TCAP-message TC-BEGIN totally in the condition in which it was received from MS, i.e. without MSC/VLR being aware of the operation concerned or of other data.

MSC/VLR has now "opened a signalling channel" on which HLR and MS can exchange components included in any desired number of operations, without MSC/VLR needing to know to which operations signalling between MS and HLR via MSC/VLR relates, or the contents of these operations.

In turn, this means that new operations and changes in existing operations, such as new data or new negative acknowledgements for instance (according to TCAP, so-called ERRORS) can be introduced into HLR and in MS without influencing MSC/VLR. This provides good properties with regard to the introduction of new services in HLR without influencing MSC/VLR. This is particularly beneficial in GSM, where the HLR operator is sometimes not the same as the MSC/VLR operator (MS is located in another network, for instance in another country).

What is claimed is:

1. In Switching Center/Visitor Location Register (MSC/VLR), a method of managing supplementary service procedures that are processed by a Home Location Register (HLR), comprising the steps of:
   a) supplying the MSC/VLR with a list comprising only those supplementary service operations that shall be terminated in the MSC/VLR;
   b) in the MSC/VLR, receiving a forward direction message from a Mobile Station (MS), the forward direction message including an intended supplementary service operation, and then comparing the intended supplementary service operation with the list of supplementary service operations;
   c) if the intended supplementary service operation is contained in the list of supplementary service operations, then terminating the intended supplementary service operation in the MSC/VLR; and
   d) if the intended supplementary service operation is not contained in the list of supplementary service operations, then forwarding the forward direction message unaltered to the HLR, wherein:
   the forward direction message is an invoke component;
   the intended supplementary service operation is encoded in an intended Operation Code contained in the invoke component;
   the list of supplementary service operations is a list of Operation Codes corresponding to only those supplementary service operations that shall be terminated in the MSC/VLR;
   in step b), comparing the intended supplementary service operation with the list of supplementary service operations comprises comparing the intended Operation Code with the list of Operation Codes;
   step c) comprises terminating the intended supplementary service operation in the MSC/VLR if the intended Operation Code coincides with one of the Operation Codes contained in the list of Operation Codes; and
   step d) comprises forwarding the forward direction message unaltered to the HLR if the intended Operation Code does not coincide with any one of the Operation Codes contained in the list of Operation Codes.

* * * * *